United States Patent

[11] 3,607,215

[72] Inventors: Shiro Watanabe, Osaka-shi; Keiichi Maruo, Suita-shi; Hiroshi Ono, Koga-gun, all of Japan
[21] Appl. No. 799,922
[22] Filed Feb. 17, 1969
[45] Patented Sept. 21, 1971
[73] Assignee Daikin Kogyo Co., Ltd.
[32] Priority Feb. 19, 1968
[33] Japan
[31] 43/10646

[54] METHOD FOR THE CONTROL OF UNDESIRED VEGETATION OF PERENNIAL GRASSES WITH FLUOROPROPIONIC ACIDS AND THEIR DERIVATIVES
13 Claims, No Drawings

[52] U.S. Cl.................................................. 71/113, 71/106, 71/118
[51] Int. Cl....................................................... A01n 9/24
[50] Field of Search............................................ 71/113

[56] References Cited
UNITED STATES PATENTS
2,949,354  8/1960  Todd.......................... 71/113

Primary Examiner—James O. Thomas, Jr.
Attorneys—Harry C. Bierman, Jordan B. Bierman and Bierman and Bierman ABSTRACT: A method for the control of undesired vegetation of perennial grasses of Cyperaceae and Gramineae which comprises applying one or more times at least one of the acids of the formula:

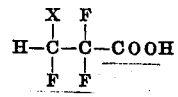

wherein X is chlorine or fluorine and their salts, amides and esters to the area where the herbicidal effect is desired in a total amount, which exerts no herbicidal action in an applied season, from about 5 g. to about 50 g. per area during the growing period of the grasses up to the three-leaf stage, the floral bud formation stage or the dormant tissue formation stage, or beyond so as to exert the herbicidal effect which controls the germination and growth of the grasses in the subsequent seasons by the accumulative phytotoxicity.

METHOD FOR THE CONTROL OF UNDESIRED VEGETATION OF PERENNIAL GRASSES WITH FLUOROPROPIONIC ACIDS AND THEIR DERIVATIVES

The present invention relates to an improvement in the use of herbicidal compounds. More particularly, it relates to an unproved method for the control of undesired vegetation of perennial grasses with fluoropropionic acids and their derivatives.

Perennial grasses of Cyperaceae and Gramineae live over several generations, and the term through one generation is herein called a "season."

The term "fluoropropionic acids and their derivatives" hereinabove used are intended to mean the chemical compounds of the formula:

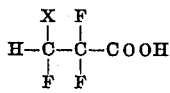

wherein X is chlorine or fluorine, i.e. 2,2,3-trifluoro-3-chloropropionic acid and 2,2,3,3-tetrafluoropropionic acid, and their salts such as metal salts (e.g. sodium, potassium, calcium, barium, magnesium, zinc, copper, irons salts), ammonium salts and amine salts e.g. triethanolamine salts), their amides such as amides N-lower alkyl amides (e.g. N-methyl, N-ethyl, N-propyl amides) and N,N-di(lower)alkyl amides (e.g. N,N-dimethyl, N,N-dipropyl amides) and their esters such as lower alkyl esters (e.g. methyl, ethyl, propyl esters) and cyano(lower)alkyl esters e.g. cyanoethyl esters).

Of the fluoropropionic acids and their derivatives, the most preferred compounds are alkali metal 2,2,2-trifluoro-3-chloropropionate and alkali metal 2,2,2-tetrafluoropropionate, which can be advantageously produced according to the following scheme:

$$CXF-CF_2 + MCN + 2H_2O \longrightarrow HCXF-CF_2-COOM + NH$$

wherein M is alkali metal (e.g. sodium, potassium) and X is as defined above. The reaction is carried out in an autoclave, and the yield of the product is excellent. Other fluoropropionic acids and their derivatives may be produced from the alkali metal 2,2,3-trifluoro3-chloropropionate or alkali metal 2,2,3,3-tetrafluoropropionate by conventional procedures.

In U.S. Pat No. 2,949,354 the herbicidal activity of the fluoropropionic acids and their derivatives is described. The application of the active ingredient in an amount from about 220 g. to about 450 g. per area required for sufficient and satisfactory herbicidal action. The use of the active ingredient in such a large amount will produce chemical injury to crop plants and, because of expense in the cost of herbicidal, is unfavorable from the economic standpoint. Thus, the herbicidal method as described in the patent may be unsuitable for actual commercial practice.

It has now been unexpectedly and surprisingly found that, when the fluoropropionic acid or its derivative is applied in a small amount to perennial grasses of Cyperaceae or Gramineae during the growing period of the grasses up to the three-leaf stage, the floral bud formation stage or the dormant tissue formation stage, or beyond, the phytotoxicity accumulates on the grasses so that their germination and growth in the subsequent seasons are markedly controlled and reduced. In this connection, it should be noted that the amount of active ingredient used is so small that no material herbicidal action can be expected in the season of application and also no substantial chemical injury on crop plants is produced.

Perennial grasses are generally vigorous and their roots are extremely resistant to various other herbicides. Further, their recovery power is markedly high. Moreover, the distribution of their roots is relatively deep and broad. For these reasons, the control of the grasses with such other herbicides has been considered to be quite difficult, if not impossible. The accumulative phytotoxicity of the fluoropropionic acids and their derivatives which completely exterminate unfavorable growth of the grasses in the seasons subsequent to the applied season is thus quite valuable.

A basic object of the present invention is to embody a method for the control of undesired vegetation of perennial grasses of Cyperaceae and Gramineae. Another object of this invention is to embody a method for the control of undesired perennial grasses of Cyperaceae and Gramineae without chemical injury to crop plants. A further object of the invention is to embody a method for the control of undesired perennial grasses of Cyperaceae and Gramineae with economy and safety to human beings, mammals and fish. These and other objects will be apparent to those conversant with the art to which the present invention pertains from the following description.

According to the present invention, the fluoropropionic acid or its derivative is applied to the area where the herbicidal effect on perennial grasses of Cyperaceae and Gramineae is desired in a total amount of from about 5 g. to about 50 g. per area during the growing period of the grasses up to the 3-leaf stage, the floral bud formation stage or the dormant tissue formation stage, and beyond so that germination and growth of the grasses in the seasons subsequent to the season of application are controlled by accumulative phytotoxicity without causing any material chemical injury to crop plants.

The fluoropropionic acid or derivatives may be applied alone but it is preferable to apply it as a composition containing a carrier material or conditioning agent of the kind commonly used and referred to in the art as a herbicidal adjuvant or modifier. Such adjuvants are usually inert solids, surface active agents and/or organic liquids. Usually about 1 percent to about 95 percent by weight of the fluoropropionic acid or its derivative is included in such a composition.

Homogeneous powder formulations can be prepared which can be used as such, diluted with inert solids to form dusts, or suspended in water for spray application. The powders usually comprise the active ingredient admixed with minor amounts of conditioning agents. Natural clays, either absorptive (such as attapulgite) or relatively nonabsorptive (such as china clays, diatomaceous earth, walnut shell flour, redwood flour, synthetic fine silica, calcium silicate and other inert solid carriers of the kind conventionally employed in powder fungicidal compositions) can be used. The active ingredient usually makes up from about 25 percent to about 90 percent of these powder compositions. The solids ordinarily should be very finely divided and should have a particle size below about 50 microns and preferably below about 2 microns. For conversion of the powders to dusts; talc, pyrophyllite, tobacco dust, volcanic ash and other dense, rapid-settling inert solids are customarily used.

Pellet formulations can be also prepared with inert solid carriers as mentioned above in the conventional manner. The active ingredient normally makes up from about 1 percent to about 30 percent of such formulations. The pellet size is usually from about 0.5 mm. to about 5 mm.

If the active compound is water soluble it can be sprayed or applied in any other desired manner to an absorptive powder, which can then be dried to produce a dry product. Any of the above absorptive materials can be used for the preparation of such products.

Liquid compositions including the active compounds above described can be prepared by admixing the compound with a suitable liquid diluent medium. The active compound can be either in solution or in suspension in the liquid medium. Typical of the liquid media commonly employed are kerosene, dimethylformamide, tetrahydrofuran, xylene, alcohols, alkylated naphthalene, glycols and ketones such as diisobutyl ketone, cyclohexanone, etc. The active ingredient usually makes up from about 0.5 percent to about 50 percent of these liquid compositions. Some of these compositions are designed to be used as such, and other to be extended with large quantities of water.

Compositions in the form of wettable powders or liquids can also include one or more surface-active agents such as wetting, dispersing or emulsifying agents. Thus mixtures of the above liquids with the active compounds can contain an emulsifying agent to make an emulsifiable oil composition. The surface-active agents cause the compositions of the liquid or dry powders to disperse or emulsify easily in water to give aqueous sprays.

The surface-active agents employed can be of the anionic, cationic or nonionic type. They include, for example, sodium oleate, sulfonated petroleum oils, alkyl aryl sulfonates, sodium lauryl sulfate, polyethylene oxides, lignin sulfonates, and other surface-active agents.

The herbicide may be applied once but it is preferable to be apply several times. In both cases, the total amount of the active ingredient should be same; e.g. from about 5 g. to about 50 g. per area. The lower limitation is necessary for exerting the accumulative phytotoxicity. The upper limitation is required to prevent the production of the chemical injury on crop plants. Even if the active ingredient is used in greater amounts, the resulting effect is not so great as the amount used would suggest. In addition, features of the present invention such as prevention of vegetation change and erosion are lost.

To achieve the desired accumulative phytotoxicity, it is essential to apply the active ingredient during the growing period of the grasses up to the three leaf stage, the floral bud formation stage or the dormant tissue stage, or beyond.

The grasses of which the germination and growth in the seasons subsequent to the applied season are markedly controlled by the present invention are Cyperaceae such as Cyprus spp. (sedges), Carex spp. (sedges), Eleocharis spp. (spikerush) or the like and Gramineae such as Bromus spp. (brome), Imperata spp. (cogon grass), Miscanthus spp. (panthus grass), Sasa spp. (bamboo grass), Sorghum spp. (Johnson grass), Roegneria spp. (couch grass), Lolium spp. (ryegrass) or the like.

Hitherto, it has been known that some herbicides inhibiting photosynthesis or metabolism temporarily exhibit their herbicidal action when applied in an amount smaller than the toxic dose, but the treated grasses soon recover. It has also been known that some other herbicides due to their hormonic activity rather promote the growth of grasses when used in an amount less than the toxic dose. However, such herbicides which can control the germination and growth of grasses by accumulative phytotoxicity have never been known. This permits control for long periods of time while using small doses.

In the present invention, the active ingredient is used in such a small amount that there is no unfavorable effect on the growth of the crop plants. Thus, the high selectivity of the herbicidal action is a further unexpected advantage of this invention.

Sometimes, in the present invention, perennial grasses of Cyperaceae and Gramineae are prevented from germinating and growing but their roots are not completely killed. Therefore, no vegetation change is caused, and erosion is prevented or minimized. This is another advantage of the invention.

Practical and presently preferred embodiments of the present invention are shown in the following Examples. In each of these Examples, parts are by weight.

EXAMPLE 1

Sodium 2,2,3,3-tetrafluoropropionate (30 parts) was dissolved in water (70 parts) to form a concentrated solution which was diluted with water to 100 times its original volume. The diluted herbicide (15 L) was sprayed uniformly on 1 area of a field where Miscanthus sinensis Anderss. (Japanese pamsas grass) was growing to a height of 110 cm. In the year of application, no difference was observed in growth between the treated stalks and the untreated stalks. Thus, both groups of grasses grew to a height of 230 cm., formed ears and withered in winter in the usual manner. In the next year, however, 100 percent of the untreated stalks germinated, whereas the treated stalks showed not germination.

EXAMPLE 2

The concentrated solution prepared as in example 1 was diluted with water to 60 times its original volume and applied to Japanese pamsas grass which was 200 cm. tall. 20 ml. per stalk were applied before earing and additional 20 ml. per stalk 1.5 months thereafter. No herbicidal effect was observed in the year of application; but in the next year, germination was completely prevented in the treated stalks, whereas 100 percent germination was observed in the untreated stalks.

For comparison, the above diluted herbicide was applied only once in an amount of 40 ml. per stalk before earing. Also, sodium chlorate was applied in an amount of 20 g. per stalk before earing. In the former case, the germination rate in the next year was 25 percent and the growth was inhibited so that the stalks were only 30 cm. tall at the maximum with no earing. In the latter case, the germination rate in the next year was 76 percent, the grasses were markedly recovered and reached 220 to 230 cm. tall by autumn.

EXAMPLE 3

An amount of the concentrated solution prepared as in example 1 was diluted with water (about 50 ml.) and applied to Japanese pamsas grass 30 cm. in diameter. The relationship between the application time and the germination rate was shown in table 1 wherein the germination rate was obtained by observation of the germination of 20 stalks.

TABLE 1

| Application time | Grass tall (cm.) | Amount of active ingredient, g./stalk (g./are) | Germination rate in the next season |
|---|---|---|---|
| Dec. 10 | 0 (Dormancy) | 0.5 (45) | 85 |
| Feb. 1 | do | 0.25 (22.5) | 100 |
| Feb. 1 | do | 0.5 (45) | 80 |
| Mar. 31 | 0 (Before germination) | 0.5 (45) | 75 |
| Mar. 31 | do | 1.5 (135) | 50 |
| May 10 | 30 (Growing period) | 0.25 (22.5) | 25 |
| July 25 | 110 (Growing period) | 0.25 (22.5) | 15 |
| July 25 | do | 0.5 (45) | 0 |
| Aug. 10 | 200 (Growing period) | 0.25 (22.5) | 15 |
| Aug. 10 | do | 0.5 (45) | 0 |
| Sept. 20 | 230 (Growing period) | 0.5 (45) | 0 |
| Untreated | | | 100 |

For comparison, a designated amount of a known herbicide was applied on Aug. 10 to Japanese pamsas grass 200 cm. tall and 30 cm. in diameter. The results are shown in table 2.

TABLE 2

| Known herbicide | Amount of active ingredient, g./stalk (g./are) | Germination rate in the next season |
|---|---|---|
| Sodium 2,2-dichloropropionate | 0.5 (45) | 100 |
| | 5 (450) | 100 |
| Trichloroacetic acid | 0.5 (45) | 100 |
| | 5 (450) | 100 |
| Sodium chlorate | 0.5 (45) | 100 |
| | 5 (450) | 100 |

From tables 1 and 2, the following conclusions are drawn:
1. When applied to Japanese pamsas grass during the growing period, the active ingredient of this invention markedly controls the termination rate in the next season. A small amount of about 0.25 g. per stalk (22.5 g. per area) is necessary. It completely prevents germination if an amount of about 0.5 g. per stalk (45 g. per area) is used. Even if germinated, the growth is controlled one-tenth to one-fifth of the normal height in comparison with untreated grass.

2. When applied during the dormant stage or before germination, no material effect for controlling the germination is observed. Also, the application in an amount of 1.5 g. per stalk (135 g. per area) produces only 50 percent prevention of germination. It is particularly to be noted that application during the growing period is much more effective than before germination at the same lower dose in spite of the previous knowledge that the fluoropropionic acids and their derivatives have been considered to be effective as herbicides for pre-emergence treatment.

3. Known herbicides in an amount of 0.5 g. per stalk do not block germination in the next season and the growth in the applied season is only slightly controlled even at a does of 5 g. per stalk (450 g. per area). No prevention of germination in the next season is achieved.

Example 4

2-Cyanoethyl 2,2,3-trifluoro-3-chloropropionate or ethyl 2,2,3-trifluoro-3-chloropropionate (20 5parts), xylene (60 parts) and nonylphenol-ethylene oxide (10 mol) condensate (20 parts) were mixed together to form a uniform solution. The solution (50 g.) was dispersed in water (20 L) and applied to 1 are of a field where Arundinaria chino Makino (bamboo grass) was growing. The application was carried out repeatedly in September of each year. The germination was markedly controlled in and after the 2nd year, and the grasses completely withered in the 4th year.

EXAMPLE 5

Copper tetrafluoropropionate (3 parts) and talc (97 parts) were mixed together to make a dust. The dust was applied uniformly in an amount of 10 kg. per 10 area to a field where Cyperus rotundus L. (purple nutsedge) was growing. In the year of application, the treated grasses grew until withering in winter in the same manner as the untreated grasses. In the next year, no germination of the treated grasses was seen.

EXAMPLE 6

2,2,3-Trifluoro-3-chloropropionamide, N,N-dimethyl 2,2,3,3-tetrafluoropropionamide or ammonium 2,2,3,3,-tetrafluoropropionate (3 parts), bentonite (27 parts) and clay (70 parts) were mixed together. The mixture was admixed with water (17 parts), kneaded, granulated and dried to obtain granules of 1 mm. in diameter. 5 kg. per 10 area of the granules were applied to a paddy field where the growth of slender spikerush (Eleocharis acicularis Roem et Schulet) was expected. No influence on the growth of the grasses was observed in the applied year, but germination of the grass in the next year was completely prevented.

EXAMPLE 7

The concentrated solution prepared as in example 1 was diluted with 100 times its volume of water and applied to a sugar beet field where couch grass was growing, 30 g. of the active ingredient was applied per are in June. In the year of application, no influence was observed on the growth of either the beet or the grass. In the next year, however, the beets grew normally but no growth of the grass was seen.

EXAMPLE 8

The application of sodium 2,2,3,3-tetrafluoropropionate in amounts of 50 g. and 200 g. per area to the fields of some crop plants before and after germination gave the results as shown in table 3 wherein the numerals have the following significance:

| Numeral | Chemical Injury |
|---|---|
| 5 | Dead |
| 4 | Large |
| 3 | Medium |
| 2 | Little |
| 1 | Rare |
| 0 | None |

TABLE 3

| Crop plants | Before germination | | After germination | |
|---|---|---|---|---|
|  | 200 g. | 50 g. | 200 g. | 50 g. |
| Rice | 5 | 5 | 5 | 0 |
| Corn | 5 | 5 | 4 | 0 |
| Sugar beet | 3 | 0 | 2 | 0 |
| Cotton | 3 | 0 | 2 | 0 |

What is claimed is:

1. A method for inhibiting germination of perennial grasses of Cyperaceae and Gramineae, which comprises applying to an area wherein said grasses are growing at least one compound of the formula:

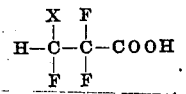

wherein X is chlorine or fluorine and the salts, amides and esters of said compound, in a total amount of from about 5 g. to about 50 g. per area, said application being during the growing period of said grasses and in a first growing season, whereby germination of said growing grasses is inhibited in a subsequent growing season, there being substantially no inhibition of the growth of said grasses during the first season.

2. The method according to claim 1, wherein the grasses are of Cyperaceae.

3. The method according to claim 1, wherein the grasses are of Gramineae.

4. A method according to claim 1, wherein said compound is in the form of a salt taken from the class consisting of sodium, potassium, calcium, barium, magnesium, zinc, copper, iron, ammonium, and triethanol amine.

5. A method according to claim 1, wherein said compound is an amide taken from the class consisting of mono and di lower alkyl.

6. A method according to claim 5, wherein said amide is taken from the class consisting of mono methyl, mono ethyl, monopropyl, di methyl and di propyl.

7. A method according to claim 1, wherein said compound is an ester taken from the class consisting of lower alkyl and cyano lower alkyl.

8. A method according to claim 7 wherein said ester is taken from the class consisting of methyl, ethyl, propyl and cyano ethyl.

9. The method according to claim 1, wherein the compound is in the form of a salt.

10. The method according to claim 1, wherein the compound is sodium 2,2,3-trifluoro-3-chloropropionate.

11. The method according to claim 1, wherein the compound is sodium 2,2,3,3-tetrafluoropropionate.

12. The method according to claim 1, wherein the compound is 2,2,3-trifluoro-3-chloropropionamide.

13. The method according to claim 1, wherein the compound is 2,2,3,3-tetrafluoropropionamide.

PO-1050
(5/69)

UNITED STATES PATENT OFFICE
CERTIFICATE OF CORRECTION

Patent No. 3,607,215     Dated September 21, 1971

Inventor(s) Shiro Watanabe, Keiichi Maruo and Hiroshi Ono

It is certified that error appears in the above-identified patent and that said Letters Patent are hereby corrected as shown below:

In the Abstract:
    4th line after formula, delete "area" insert -- are --.

In the Specification:
    Column 2, line 20, delete "area" insert -- are --.
    Column 3, line 17, delete "area" insert -- are --.
    Column 4, second line from end: delete "area" insert --are--.
    Column 5, line 1, delete "area" insert -- are --.
    Column 5, line 8, delete "area" insert -- are --.
    Column 5, line 19, delete "area" insert -- are --.
    Column 5, line 51, delete "area" insert -- are --.
    Column 5, line 70, delete "area" insert -- are --.

In the Claims:
    Column 6, line 36, delete "area" insert -- are --.

Signed and sealed this 19th day of March 1974.

(SEAL)
Attest:

EDWARD M. FLETCHER, JR.
Attesting Officer

C. MARSHALL DANN
Commissioner of Patents